Nov. 9, 1937.     A. HEINE     2,098,387
FILM DRIVE MECHANISM
Filed May 1, 1935
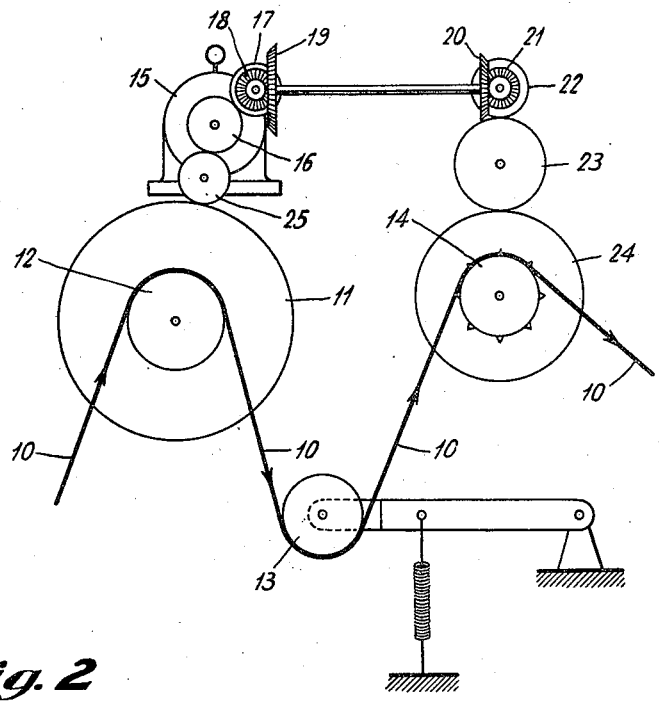
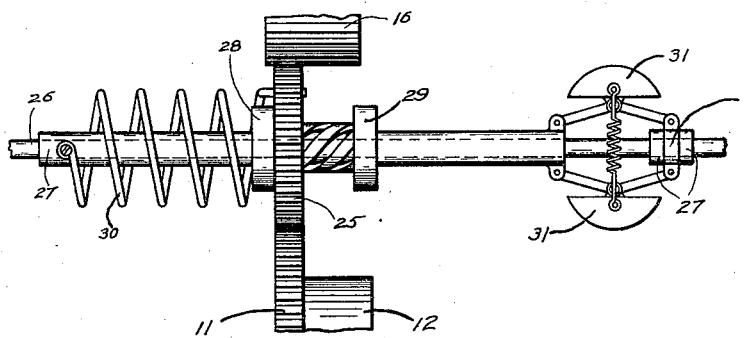
INVENTOR
ADOLF HEINE
BY
ATTORNEY Patented Nov. 9, 1937

2,098,387

UNITED STATES PATENT OFFICE 2,098,387

FILM DRIVE MECHANISM

Adolf Heine, Berlin-Zehlendorf, Germany, assignor to Klangfilm G. m. b. H., Berlin, Germany, a corporation of Germany Application May 1, 1935, Serial No. 19,137
In Germany July 25, 1934

10 Claims. (Cl. 271—2.3)

This invention relates to film drive or feed mechanisms which are particularly suited for the driving of sound films and which comprises a flywheel driven primarily or exclusively by the film strip during normal operation.

Mechanisms of this kind are attended with certain difficulties on starting the apparatus in that the film strip during the starting period is called upon to withstand increased traction due to acceleration of the flywheel.

In accordance with the present invention, the flywheel is caused to come in circumferential mesh during the starting period of the apparatus with such a tooth-wheel of the motor gear or optionally with a tooth-wheel directly seated upon the motor shaft, which, in the presence of normal speed of the motor has the same peripheral speed as the flywheel is to have under normal operating conditions.

Among the principal objects of the invention are the provision of an improved film drive mechanism and method of operation whereby a flywheel normally driven by the film is directly coupled to the film drive motor only at a predetermined time after motion of the film is initiated and is uncoupled from the drive motor when the film speed has attained a predetermined value.

The invention will be better understood from the following description when considered in connection with the accompanying drawing, and its scope will be pointed out in the appended claims.

Referring to the drawing:

Fig. 1 is a diagrammatic showing of one form of film moving mechanism embodying the invention, and Fig. 2 illustrates certain details of the coupling between the film moving mechanism and the film driven flywheel.

One exemplified embodiment of the invention is illustrated schematically in the drawing. 10 denotes the film strip, 11 is the flywheel, the latter being rigidly connected with a smooth roller 12. From the latter, the film strip is run over a yielding film tensioning roll 13 the motion of which by the provision of suitable well known means (not shown in the drawing) is capable of being damped, and from there over a sprocket wheel 14, the latter being driven from the motor 15 through the intermediary of the tooth and bevel wheels 16 to 24. During the starting of the apparatus, the flywheel 1 is coupled by way of another tooth-wheel 25 with the elongated gear-wheel 16 mounted on the motor shaft so that the sprocket-wheel 14 and the flywheel 11 during the entire starting period are capable of being run up to speed in a uniform and steady way, with the consequence that the film strip will not be called upon to transmit any energy or torque used for the acceleration of the flywheel.

As previously indicated, the flywheel 11 may be coupled not only with the tooth-wheel 16 directly mounted on the motor shaft, but optionally also with another gear-wheel. The choice of the proper tooth-wheel depends exclusively upon the speed of the motor 15 and the desired circumferential speed or the diameter of the flywheel 11.

The arrangement as hereinbefore described may be so designed that the flywheel 11, after switching in the motor 15, for a certain constant length of time, say, for five seconds, is automatically coupled with the motor 15. Disengagement between the said flywheel 11 and the motor is also accomplishable manually or else the disengagement may be made a function of a speed relay, serving to dissolve the coupling whenever the normal rate of rotation has been approximately reached.

Fig. 2 shows a suitable form of coupling between the gear 16 and the flywheel 11. This coupling includes a shaft 26 upon which is rotatably mounted a collar 27. The gear 25 is threaded on this collar to move between stops 28 and 29, this action being controlled by a spring 30 in a manner similar to the "Bendix" drive of an automobile. To the left end of the collar is fixed one end of a fly-ball governor 31, the other end of this governor being pivoted to a collar 32 rotatable upon the shaft 26 between the fixed collars 27.

As will be readily understood the starting of the motor 15 will pull the film through the apparatus in the direction indicated by the arrow, the gear 25 will be moved along the collar 27 into engagement with the gear 28 on the periphery of the flywheel and the flywheel will be driven directly from the motor 15. The time at which the gear 25 is caused to engage the gear 28 will, of course, be dependent upon the strength of the spring 30 and other well known factors. As soon as the fly-ball governor 31 has attained sufficient speed, however, the gear 25 is moved out of engagement with the gear 28 and the flywheel is driven by the film. The particular speed at which the gears are disengaged, of course, depends on the adjustment of the governor.

As will be readily understood, this method of operation has the particular advantage that the spring idler 13 is tensioned before the film comes up to speed and the oscillations likely to result are avoided. The fact that the gears 25 and 28 are not brought into engagement until a predetermined time after starting the movement of the film has the advantage that the starting torque, which is otherwise relatively high, is reduced. The improved coupling control arrangement operates automatically to control engagement and disengagement of the gears, thus avoiding the necessity of the attention of the operator, and avoiding the improper control of the coupling.

Having now described my invention, I claim:

1. The combination of a film drive mechanism, a film driven flywheel, and means operable to couple said flywheel to said mechanism a fixed time interval after initiating the operation of said mechanism.

2. The combination of a film drive mechanism, a film driven flywheel, means operable to couple said flywheel to said mechanism a fixed time interval after initiating the operation of said mechanism, and operable to uncouple said flywheel from said mechanism in response to a predetermined speed of said mechanism.

3. The combination of a film drive mechanism, a film including a spring idler, a film driven flywheel, and means operable to couple said flywheel to said mechanism a fixed time interval after initiating the operation of said mechanism.

4. The combination of a film drive mechanism, a film driven fly wheel, and means responsive to movement of said mechanism to couple said fly wheel to said mechanism a fixed time interval after initiation of the operation of said mechanism.

5. The combination of a film drive mechanism, a film driven fly wheel, means responsive to the movement of said mechanism to couple said fly wheel to said mechanism a fixed time interval after initiation of the operation of said mechanism, and speed-controlled means operable to uncouple said fly wheel from said mechanism.

6. In combination, a film drive mechanism, a film driven fly wheel, a spring idler in cooperative relation to the film between the drive mechanism and the fly wheel, and means operable to couple said fly wheel to said mechanism a fixed time interval after initiation of the operation of said mechanism whereby a predetermined tension is placed upon the spring idler.

7. In combination, a film drive mechanism, a film driven fly wheel, a spring idler in cooperative relation to the film between the drive mechanism and the fly wheel, and means responsive to the movement of said mechanism to couple said fly wheel to said mechanism a fixed time interval after initiation of the operation of said mechanism whereby a predetermined tension is placed upon the spring idler.

8. Apparatus of the class described comprising a flywheel adapted to cooperate with a film, means for drawing film through the apparatus, driving means, and means for starting the flywheel when the apparatus is started, the said starting means including a gear connected to said driving means, means for connecting said gear to the flywheel when the driving means is started and additional means for disconnecting the said gear from engagement with the flywheel at a predetermined speed.

9. Apparatus of the class described comprising a flywheel adapted to cooperate with a film, means for drawing film through the apparatus, driving means, and means for starting the flywheel when the apparatus is started, the said starting means including a gear connected to said driving means, a worm supporting said gear and a spring connecting said gear and said worm for connecting said gear to the flywheel when the driving means is started and additional means for disconnecting the said gear from engagement with the flywheel at a predetermined speed.

10. Apparatus of the class described comprising a flywheel adapted to cooperate with a film, means for drawing film through the apparatus, driving means, and means for starting the flywheel when the apparatus is started, the said starting means including a gear connected to said driving means, a worm supporting said gear and a spring connecting said gear and said worm for connecting said gear to the flywheel when the driving means is started and a governor for disconnecting the said gear from engagement with the flywheel at a predetermined speed.

ADOLF HEINE.